United States Patent
Shteynberg et al.

(10) Patent No.: US 8,427,066 B2
(45) Date of Patent: *Apr. 23, 2013

(54) DIGITALLY CONTROLLED CURRENT REGULATOR FOR HIGH POWER SOLID STATE LIGHTING

(75) Inventors: Anatoly Shteynberg, San Jose, CA (US); Harry Rodriguez, Gilroy, CA (US)

(73) Assignee: Point Somee Limited Liability Company, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/280,555

(22) Filed: Oct. 25, 2011

(65) Prior Publication Data

US 2012/0081018 A1 Apr. 5, 2012

Related U.S. Application Data

(60) Continuation of application No. 11/804,549, filed on May 18, 2007, now Pat. No. 8,067,896, and a division of application No. 11/804,549.

(60) Provisional application No. 60/802,234, filed on May 22, 2006.

(51) Int. Cl.
*H05B 41/16* (2006.01)

(52) U.S. Cl.
USPC ........ 315/247; 315/185 S; 315/291; 315/312; 315/224

(58) Field of Classification Search ................... 315/247, 315/246, 224, 291, 307–326, 180 S
See application file for complete search history.

(56) References Cited

U.S. PATENT DOCUMENTS

| 6,801,003 | B2 | 10/2004 | Schanberger |
| 7,116,052 | B2 | 10/2006 | Ito |
| 7,659,673 | B2 | 2/2010 | Lys |
| 2002/0047624 | A1 | 4/2002 | Stam |

*Primary Examiner* — Tuyet Thi Vo
(74) *Attorney, Agent, or Firm* — Christensen O'Connor Johnson Kindness PLLC

(57) ABSTRACT

A representative apparatus embodiment provides for controlling current supplied to solid state lighting, such as light emitting diodes. A representative apparatus comprises a memory adapted to store a plurality of current parameters, and a control circuit adapted to modulate an energizing cycle time period for providing a substantially constant DC average current to the solid state lighting in response to a selected current parameter from the plurality of current parameters. In a representative embodiment, the control circuit modulates a current provided to the solid state lighting in response to a predetermined minimum current level ($I_{MIN}$) parameter and a predetermined peak current level ($I_P$) parameter, such that the DC average current level ($I_O$) is substantially proportional to one-half of a sum of a predetermined peak current level ($I_P$) and a predetermined minimum current level $$I_M\left(I_O \propto \frac{I_P + I_{MIN}}{2}\right).$$

23 Claims, 8 Drawing Sheets

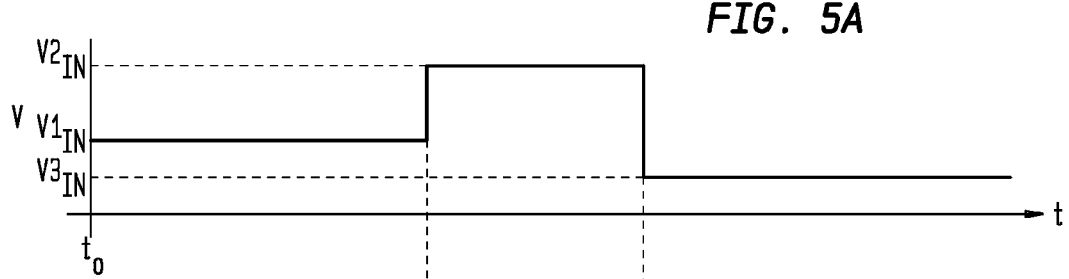
FIG. 5A
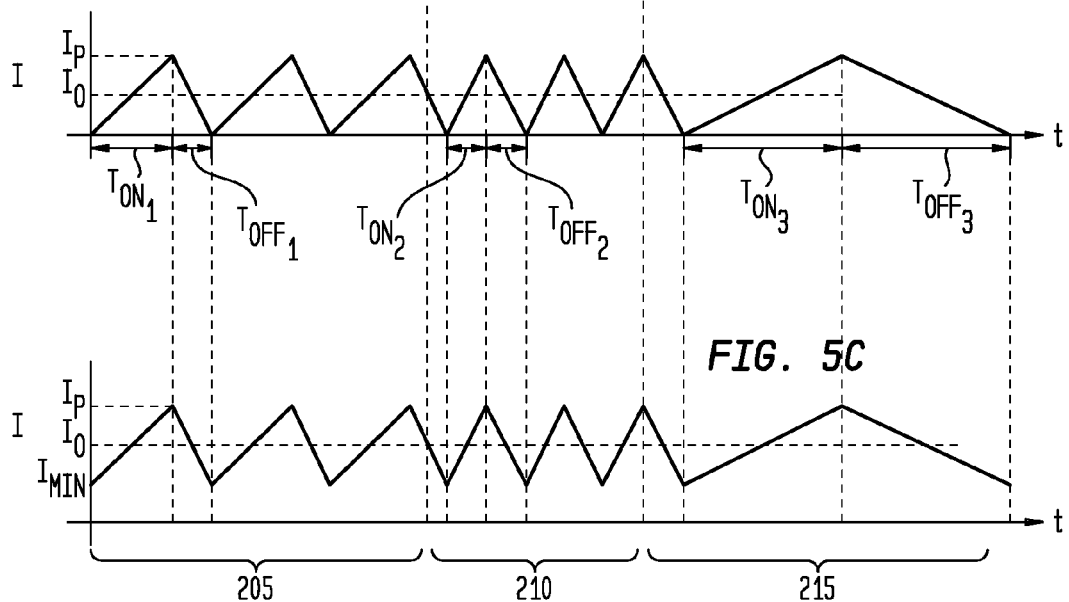
FIG. 5B
FIG. 5C

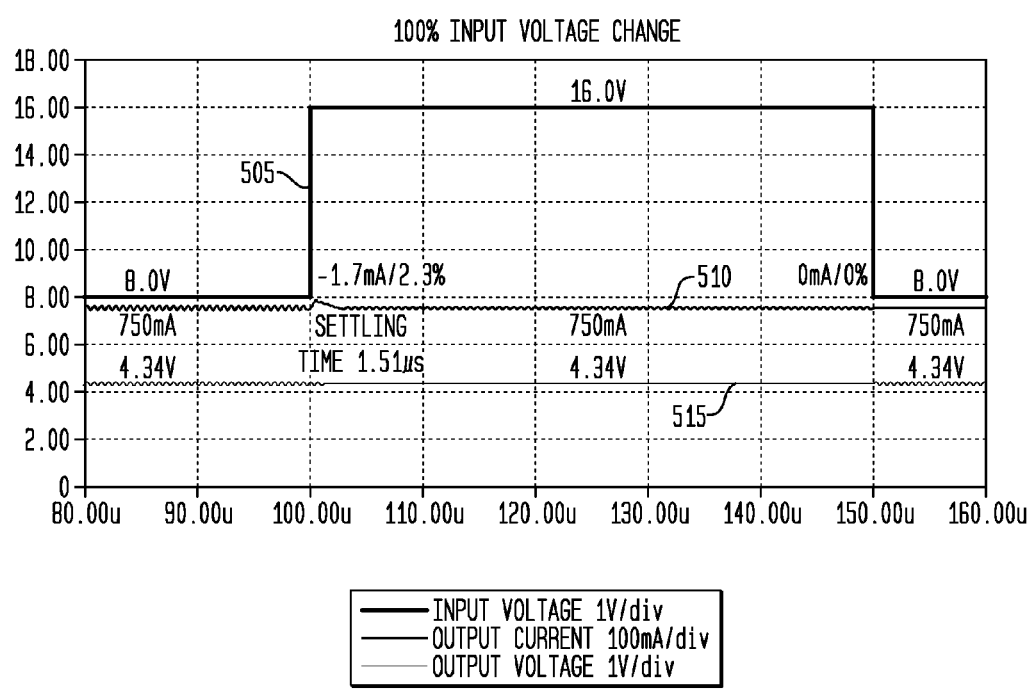

DIGITALLY CONTROLLED CURRENT REGULATOR FOR HIGH POWER SOLID STATE LIGHTING

CROSS-REFERENCE TO RELATED APPLICATIONS

This application is a continuation and a division of, and claims priority to, U.S. patent application Ser. No. 11/804,549, now U.S. Pat. No. 8,067,896, filed May 18, 2007, inventors Anatoly Shteynberg and Harry Rodriguez, entitled "Digitally Controlled Current Regulator for High Power Solid State Lighting," which claims the benefit of, and is a conversion of, U.S. Provisional Patent Application No. 60/802,234, filed May 22, 2006, inventors Anatoly Shteynberg and Harry Rodriguez, entitled "High Power Digital LED Driver," which is commonly assigned herewith, the contents of which are incorporated herein by reference, and with priority claimed for all commonly disclosed subject matter.

BACKGROUND

A wide variety of LED drivers or regulators are used in providing high power or high current levels to high brightness LEDs, on the order of 20-25 mA, and typically up to 1 A. For example, Supertex Inc. (HV9925 data sheet) and Melexis Microelectronic Integrated Systems (MLX10803 data sheet) provide peak current control with a constant off-time, but require external loop compensation and restrict the accuracy and dynamics of the converter. External loop compensation, requiring feedback through a current sense resistor which is used to measure the current through the LEDs, compromises the efficiency of the regulator. That decreased efficiency means excessive power consumption, which is highly detrimental for portable, battery-operated applications.

LED drivers generally have very low efficiency, making them highly unsuitable for applications in portable devices such as cameras and mobile telephones. These drivers generate a very high ratio of peak to average current for typical LED devices, leading to potential damage and reduced reliability. In addition, such drivers use analog current regulators, rather than digital, resulting in increased cost for the driver.

Accordingly, a need remains for a driver circuit or current regulator for solid state devices, such as LEDs used in lighting applications, which can provide digital control, without requiring external compensation. Lastly, the current regulator should utilize comparatively few components, providing reduced cost and size, while simultaneously increasing its efficiency and enabling longer battery life when used in portable devices.

SUMMARY

The representative embodiments of the present invention provide numerous advantages for supplying power to solid state lighting, including light emitting diodes. The representative embodiments provide digital control, without requiring external compensation. The representative embodiments do not utilize significant resistive impedances in the current path to the LEDs, resulting in appreciably lower power losses and increased efficiency. The representative current regulator embodiments also utilize comparatively fewer components, providing reduced cost and size, while simultaneously increasing efficiency and enabling longer battery life when used in portable devices, for example, by not utilizing error amplifiers of the prior art.

In a first representative embodiment, a current regulator is provided for controlling current to solid state lighting, with the current regulator couplable to an AC or DC power source, which also may be a battery. The representative current regulator comprises a memory adapted to store a plurality of current parameters and a control circuit coupled to the memory, with the control circuit adapted to modulate an energizing cycle time period for providing a substantially constant DC average current to the solid state lighting in response to a selected current parameter of the plurality of current parameters. In representative embodiments, the plurality of current parameters comprise a predetermined minimum current level ($I_{MIN}$) and a predetermined peak current level ($I_P$). For a discontinuous (critical conduction) mode, the predetermined minimum current level ($I_{MIN}$) is substantially close to zero.

The representative control circuit may be further adapted to provide the substantially constant DC average current by maintaining substantially constant a predetermined peak current level ($I_P$) and a predetermined minimum current level ($I_{MIN}$). Similarly, the representative control circuit may be further adapted to modulate the energizing cycle time period by providing an increasing current level to an inductor until the predetermined peak current level ($I_P$) is substantially reached and subsequently by providing a decreasing current level to the inductor until the predetermined minimum current level ($I_{MIN}$) is substantially reached.

In representative embodiments, the DC average current level ($I_O$) is substantially equal to one-half of a sum of a predetermined peak current level ($I_P$) and a predetermined minimum current level $$I_{MIN}\left(I_O \approx \frac{I_P + I_{MIN}}{2}\right),$$

or is substantially proportional to one-half of a sum of a predetermined peak current level ($I_P$) and a predetermined minimum current level $$I_M\left(I_O \propto \frac{I_P + I_{MIN}}{2}\right).$$

Also in representative embodiments, the current regulator comprises: an inductor coupled to the solid state lighting; a switch coupled to the control circuit and to the inductor or to the solid state lighting; a current sensor coupled to the switch; and a first comparator coupled to the current sensor and the control circuit, wherein the control circuit is further adapted to turn the switch on to commence an energizing cycle and to turn the switch off when the first comparator indicates that an inductor current has increased to a predetermined peak level. In addition, the current regulator may further comprise a voltage sensor and a second comparator coupled to the voltage sensor and to the control circuit wherein the control circuit is further adapted to turn the switch on to commence an energizing cycle when the second comparator indicates that an inductor current has decreased to a predetermined minimum level. Also in addition, the current regulator may further comprise a second current sensor and a third comparator coupled to the current sensor and the control circuit wherein the control circuit is further adapted to turn the switch on to commence an energizing cycle when the third comparator indicates that an inductor current has decreased to a predetermined minimum level.

A representative method of providing power to a solid state lighting system is also disclosed. The representative method comprises: starting an energizing cycle by providing current through an inductor coupled to the solid state lighting system; monitoring the inductor current level; reducing the inductor current level when a predetermined peak inductor current level is reached; and commencing a next energizing cycle by increasing the inductor current level when a predetermined minimum inductor current level is reached.

In another representative embodiment, an apparatus is provided for controlling current to solid state lighting, with the apparatus being couplable to a power source. In a representative embodiment, the apparatus comprises a memory adapted to store a predetermined minimum current level ($I_{MIN}$) parameter and a predetermined peak current level ($I_P$) parameter and a controller coupled to the memory, the control circuit adapted to provide a substantially constant DC average current to the solid state lighting by modulating a current provided to the solid state lighting in response to the predetermined minimum current level ($I_{MIN}$) parameter and the predetermined peak current level ($I_P$) parameter.

In yet another representative embodiment, a current regulator is disclosed for providing substantially constant DC average current to solid state lighting, with the current regulator being couplable to a power source. In a representative embodiment, the current regulator comprises: an inductor coupled to the power source and coupled to the solid state lighting; a switch coupled to the inductor or to the solid state lighting; a first current sensor coupled to the switch; a first comparator coupled to the first current sensor; a voltage sensor coupled to the switch; a second comparator coupled to the voltage sensor; a second current sensor in series with the inductor; a third comparator coupled to the second current sensor; a memory adapted to store a plurality of current parameters; and a control circuit coupled to the memory and to the first, second, and third comparators, the control circuit adapted to turn the switch on to commence an energizing cycle when the second comparator or the third comparator indicate that an inductor current has reached a predetermined minimum level and to turn the switch off when the first comparator indicates that the inductor current has reached a predetermined peak level.

Numerous other advantages and features of the present disclosure will become readily apparent from the following detailed description and the embodiments thereof, from the claims, and from the accompanying drawings.

BRIEF DESCRIPTION OF THE DRAWINGS

The objects, features, and advantages of the present disclosure will be more readily appreciated when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 5A, 5B, and 5C are graphical diagram of input voltage and LED current levels for a representative current regulator (or converter) in accordance with the teachings of the present disclosure;

FIG. 8 is a graphical diagram illustrating input voltage and LED current levels during a simulation of a representative embodiment of a current regulator (or converter) in accordance with the teachings of the present disclosure.

DETAILED DESCRIPTION

Figure 1:
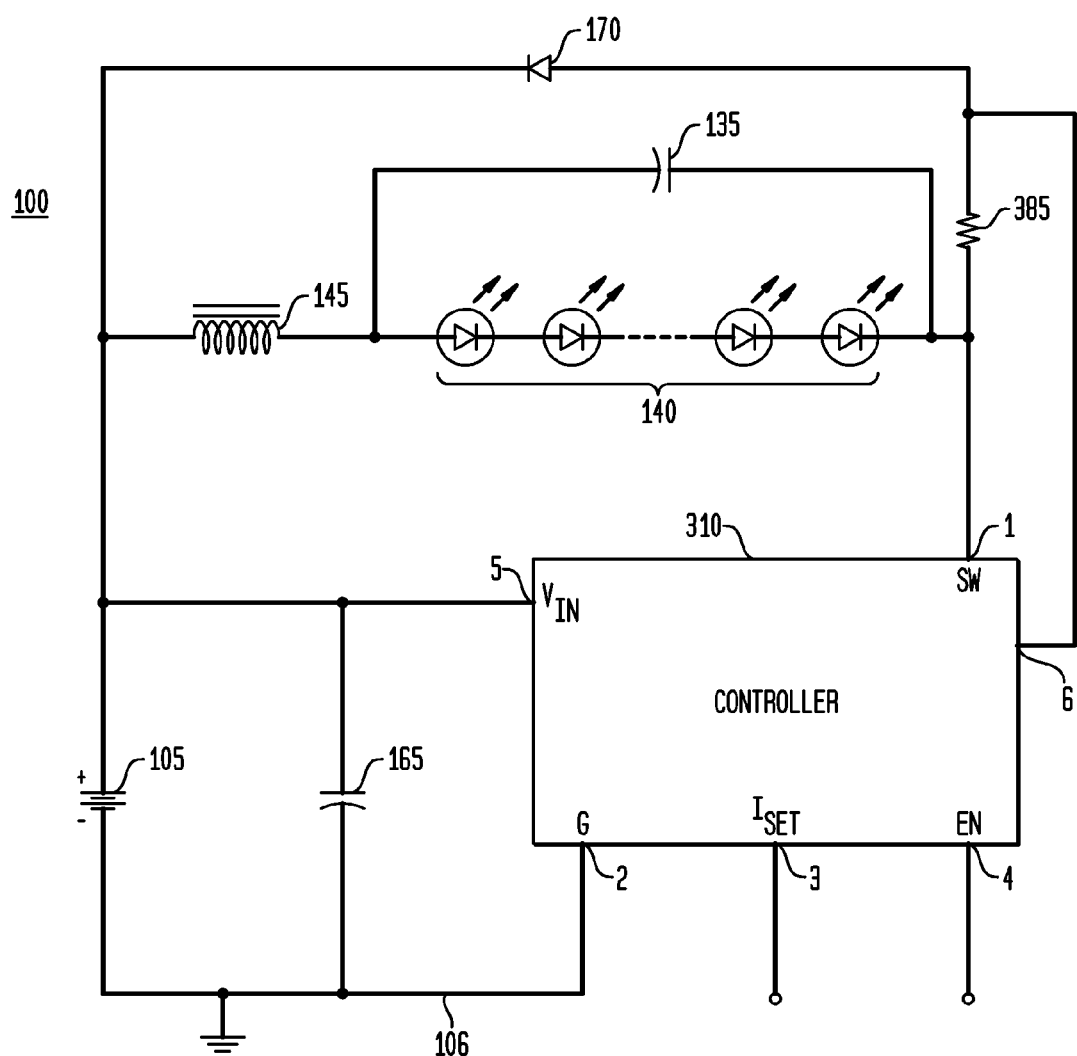
FIG. 1 is a circuit and block diagram of a representative first embodiment of a current regulator (or converter) in accordance with the teachings of the present disclosure.

While the present disclosure is susceptible of embodiment in many different forms, there are shown in the drawings and will be described herein in detail specific representative embodiments thereof, with the understanding that the present description is to be considered as an exemplification of the principles of the disclosure and is not intended to limit the disclosure to the specific embodiments illustrated. In this respect, before explaining at least one embodiment consistent with the present disclosure in detail, it is to be understood that the disclosure is not limited in its application to the details of construction and to the arrangements of components set forth above and below, illustrated in the drawings, or as described in the examples. Methods and apparatuses consistent with the present disclosure are capable of other embodiments and of being practiced and carried out in various ways. Also, it is to be understood that the phraseology and terminology employed herein, as well as the abstract included below, are for the purposes of description and should not be regarded as limiting.

Figure 2:
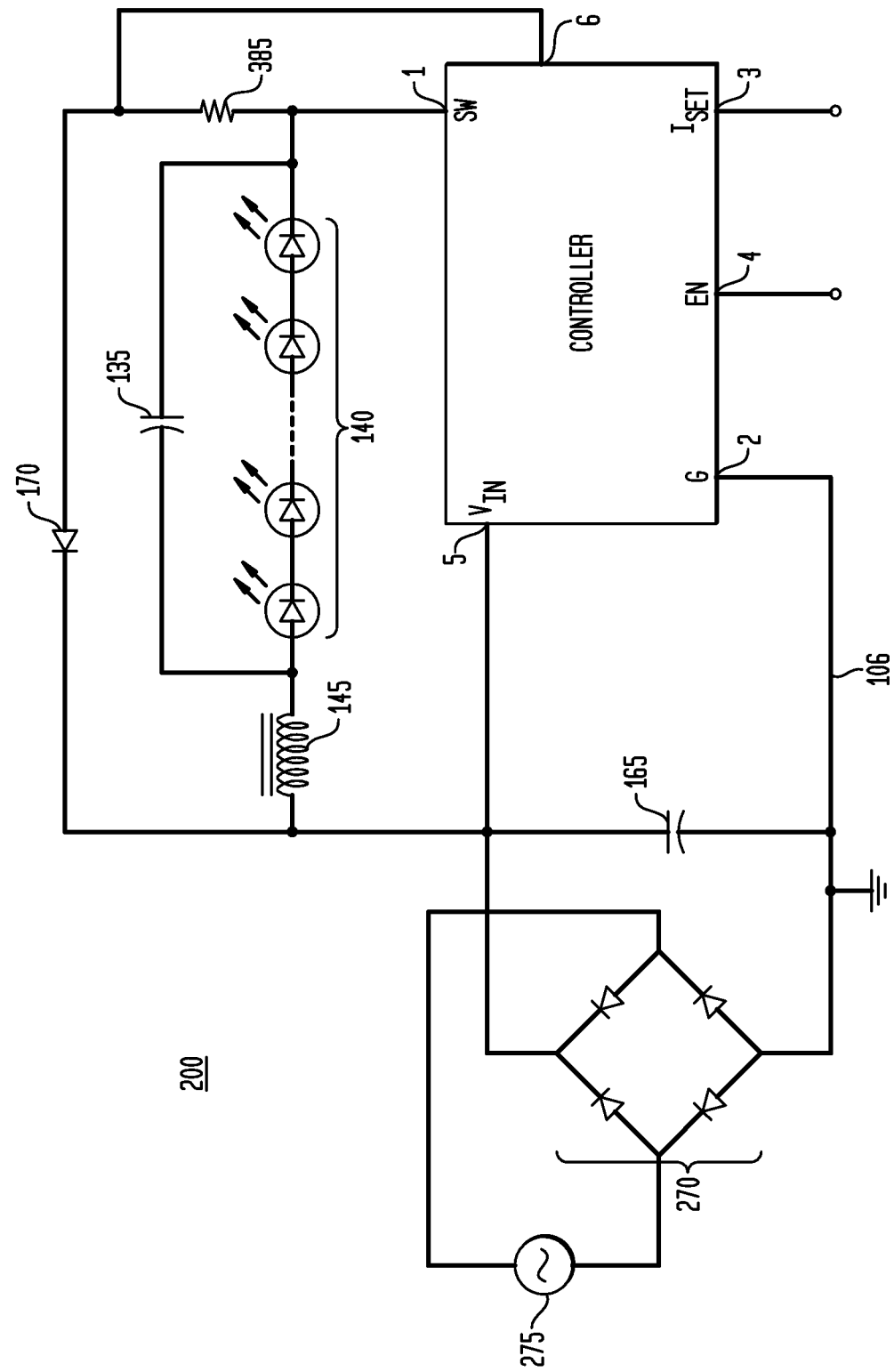
FIG. 2 is a circuit and block diagram of a representative second embodiment of a current regulator (or converter) in accordance with the teachings of the present disclosure.

FIG. 1 is a circuit and block diagram of a first representative embodiment of a current regulator (or converter) 100 in accordance with the teachings of the present disclosure. As illustrated, the representative regulator 100 has a buck configuration and is coupled to a DC power supply 105, such as a battery. FIG. 2 is a circuit and block diagram of a representative second embodiment of a current regulator (or converter) 200 in accordance with the teachings of the present disclosure. As illustrated, the representative regulator 200 also has a buck configuration and is coupled through a rectifier 270 to an AC power source 275, and is otherwise identical to and operates the same as representative regulator 100.

Figure 3:
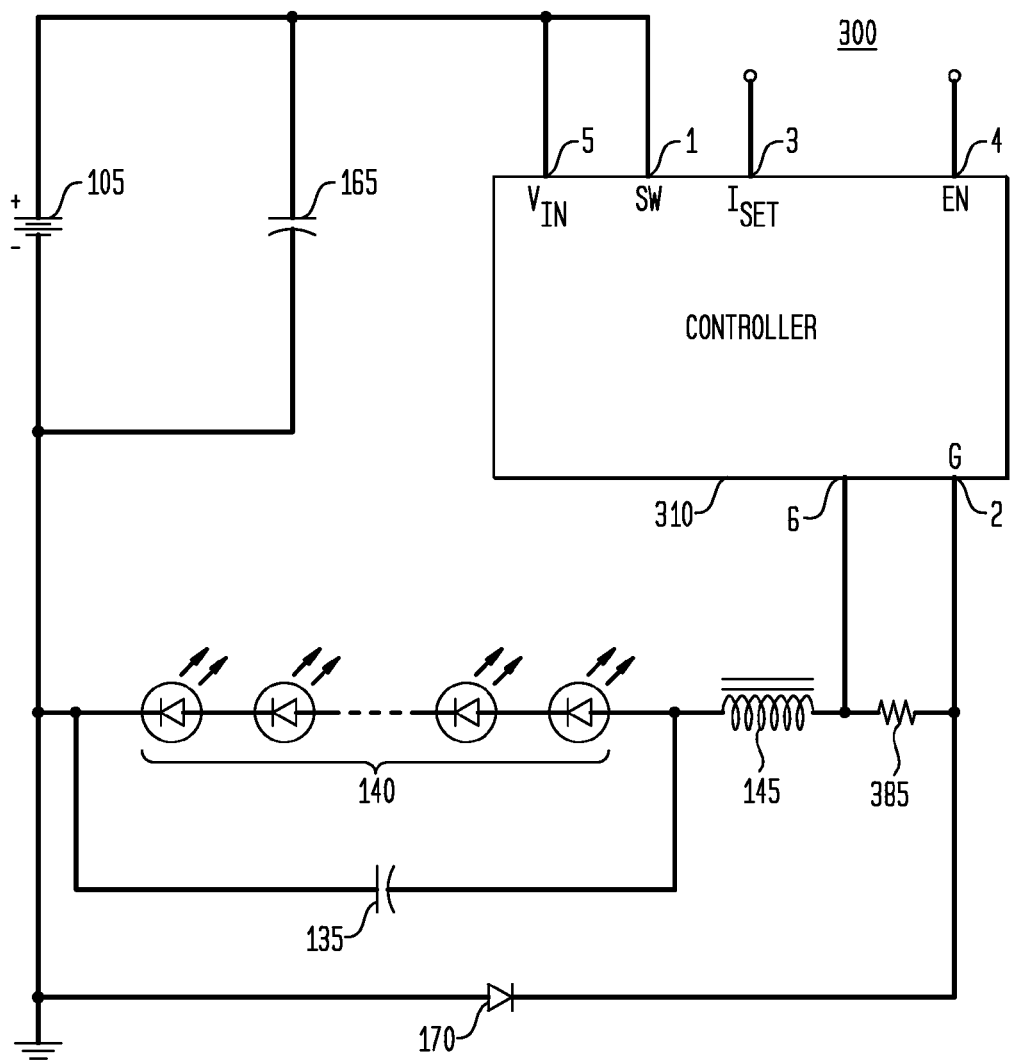
FIG. 3 is a circuit and block diagram of a representative third embodiment of a current regulator (or converter) in accordance with the teachings of the present disclosure.

FIG. 3 is a circuit and block diagram of a representative third embodiment of a current regulator (or converter) 300 in accordance with the teachings of the present disclosure. As illustrated, the representative regulator 300 also has a buck configuration and is also coupled to a DC power supply 105, such as a battery, and differs from representative regulator 100 where inductor 145 and LEDs 140 are coupled through the negative terminal of the DC power supply 105, and is otherwise similar to and operates the same as representative regulator 100, provided the illustrated portion of rail 106 (of FIG. 1, and being terminal 2 in FIG. 3) is coupled as illustrated in FIG. 3, rather than coupled to ground (FIG. 1).

Figure 4:
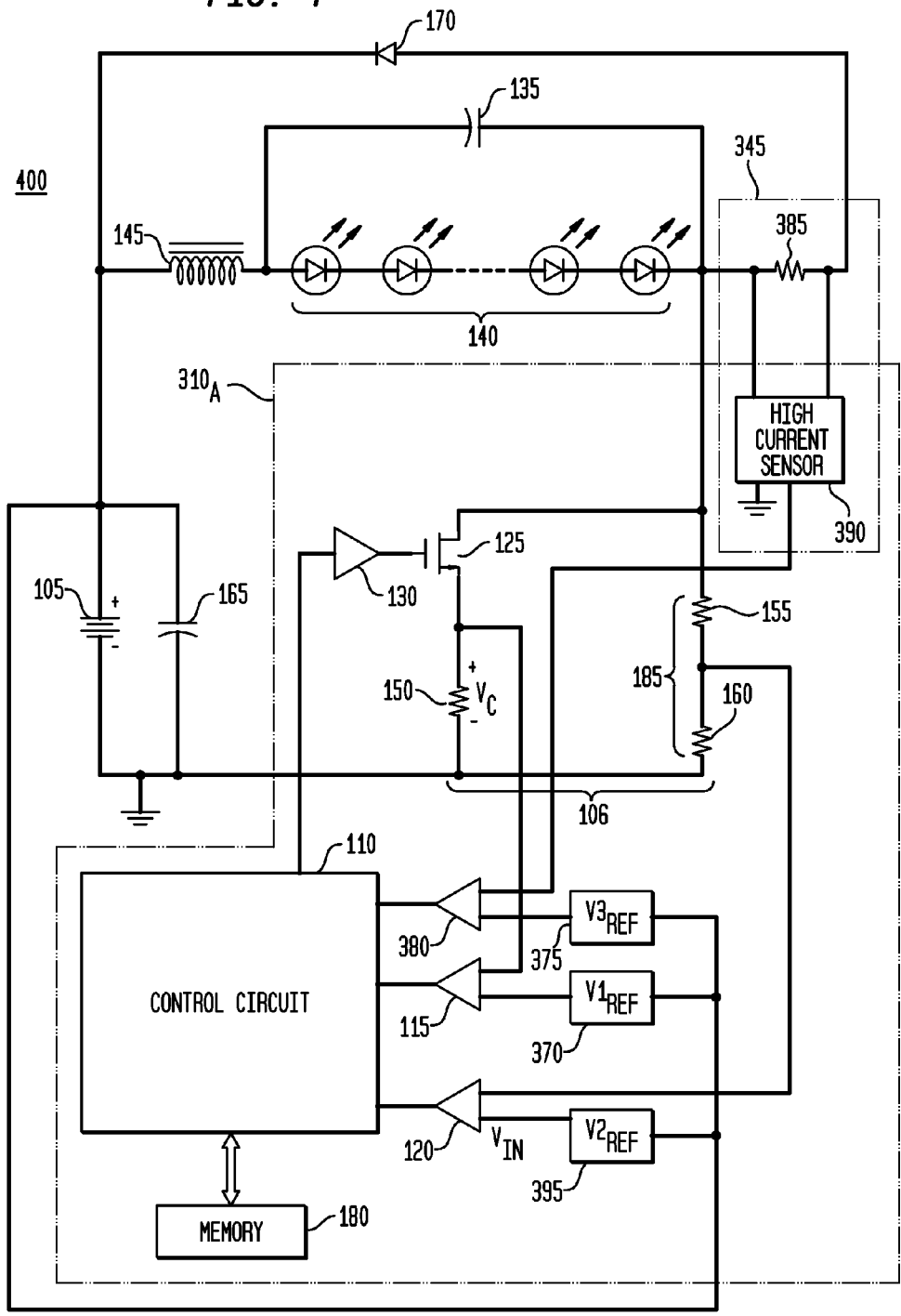
FIG. 4 is a circuit and block diagram of a representative fourth embodiment of a current regulator (or converter) in accordance with the teachings of the present disclosure.

FIG. 4 is a circuit and block diagram of a representative fourth embodiment of a current regulator (or converter) 400 in accordance with the teachings of the present disclosure. As illustrated, the representative regulator 400 utilizes a similar circuit configuration as representative regulator 100, and serves to illustrate a representative controller 310 (illustrated as controller 310$_A$) in greater detail.

In accordance with the present disclosure, the regulators 100, 200, 300, 400 are coupled to one or more LEDs 140 which, when energized as discussed below, emit light in the visible spectrum. Any reasonable number of LEDs 140 may be utilized, depending upon the desired application. While illustrated in buck configurations, the regulators 100, 200, 300, 400 may be provided in other configurations (such as boost, buck boost) equivalently. The LEDs 140 may be energized in any of a plurality of modes, such as in a continuous current mode (FIG. 5C) or in a discontinuous (or critical conduction) current mode (FIG. 5B). Also, the regulators 100, 200, 300, 400 provide current regulation in an open loop system, using stored parameter values, without requiring the feedback and significant number of components of prior art current regulators. Not separately illustrated in FIGS. 1-4 are common components for a digital logic circuit, such as clocking or oscillation circuits.

The representative regulators 100, 200, 300, 400 comprise a controller 310, filter capacitors 135 and 165, inductor 145, and diode (or rectifier) 170. For a continuous current mode, current sense resistor 385 (as part of a second current sensor 345, discussed below) is generally also included. The controller 310 may be implemented or embodied in any of various forms, such as the representative embodiments shown as controller 310$_A$ and controller 310$_B$ illustrated in FIGS. 4 and 6. The controller 310 comprises digital or other combinational logic devices (e.g., transistors) which are configured or adapted to perform the functionality discussed below. Accordingly, while the operation of regulators 100, 200, 300, 400 is explained with reference to the representative controller 310$_A$, it will be understood that innumerable other controller configurations may be utilized equivalently, and all such controllers are within the scope of the present disclosure. In addition, while illustrated as having six terminals, the controller 310 may be implemented with fewer or additional terminals.

The controller 310$_A$, illustrated as a selected instantiation of a controller 310 (in FIG. 4), comprises a control circuit (i.e., digital logic block) 110, a memory 180, comparators (a first comparator 115, a second comparator 120, and a third comparator 380), a "driving" switch 125 (typically implemented utilizing a transistor, such as the illustrated MOSFET) (which also may be operated via a buffer 130 or other driving circuit), a first current sensor 150 (typically implemented as a resistor, as illustrated), and a voltage sensor 185 (typically implemented as a voltage divider (resistors 155, 160), as illustrated). A second current sensor 345 optionally may be included (for sensing minimum current levels in the continuous mode), and is typically implemented using the current sense resistor 385 (which may or may not be included within the controller 310$_A$) in series with the inductor 145, and a "high" current sensor 390 (which will convert a differential voltage across the current sense resistor 385 into a common voltage for use by third comparator 380). In representative embodiments, in addition to the input voltage (V$_{IN}$), three reference voltages are provided, a first predetermined voltage reference V1$_{REF}$ generated in block 370 (used in a peak current determination, discussed below), a second predetermined voltage reference V2$_{REF}$ generated in block 395 (used in a minimum current determination in discontinuous (critical conduction) mode, also discussed below), and a third predetermined voltage reference V3$_{REF}$ generated in block 375 (used in a minimum current determination in continuous mode, also discussed below). In the event that the apparatus 100, 200, 300, 400 will only be operated in either a discontinuous mode or a continuous mode (and not both), then only those corresponding components need to be included (e.g., voltage divider 185 with second comparator 120 and second predetermined voltage reference (V2$_{REF}$) generator 395 or second current sensor 345 with third comparator 380 and third predetermined voltage reference (V3$_{REF}$) generator 375). The control circuit 110 may be implemented utilizing any type of digital logic, such as a finite state machine, a controller, a processor, or any other arrangement of gates which performs the functionality discussed below.

As discussed in greater detail below, the control circuit 110 is utilized to control the energizing of the LEDs 140, by controlling the switching frequency (or corresponding energizing period) of the switch 125 and, more particularly, by controlling both the "on time" of the switch 125 (T$_{ON}$), namely, the time period during which current builds or increases to a predetermined peak or maximum level (I$_P$) in the inductor 145 and LEDs 140, and the "off time" of the switch 125 (T$_{OFF}$), namely, the time period during which current falls or decreases to a predetermined minimum level (I$_{MIN}$) in the inductor 145 and LEDs 140. In representative embodiments, the on (T$_{ON}$) and off (T$_{OFF}$) time periods are variable and are controlled independently of each other (e.g., rather than having fixed, predetermined, or invariant on or off times, for example). The predetermined minimum current level (I$_{MIN}$) may be substantially close to zero for a discontinuous energizing mode (FIG. 5B), or may be substantially close to any predetermined level greater than zero for a continuous energizing mode (FIG. 5C). By independently controlling both the on and off durations of switching, the controller 310 thereby controls both the peak and minimum current levels, and thereby also controls the average current level (I$_O$) in the inductor 145 and LEDs 140. In addition, the controller 310 is adapted or configured to maintain a substantially constant average current level (I$_O$) in the inductor 145 and LEDs 140, and substantially constant peak (I$_P$) and minimum (I$_{MIN}$) current levels, regardless of variation in the input voltage levels (V$_{IN}$) to the device, such as provided by the battery 105 or rectifier 270, particularly as those input voltage levels may change over time, such as when batteries age, or due to typical variations in the AC line voltages provided by electrical utilities. Also, the controller 310 is responsive to such changes within very few energizing cycles, providing very accurate and highly regulated current control.

By controlling both the on and off time periods (durations) of the switching of current to the inductor 145 and LEDs 140, and by maintaining substantially constant peak (I$_P$) and minimum (I$_{MIN}$) current levels, the controller 310 ultimately controls the average DC level of current in the inductor 145 and LEDs 140 using open loop control, without complicated feedback (or other closed loop) mechanisms, error amplification, or inserting other devices in the current path which would result in power losses and lower efficiency.

The representative regulators 100, 200, 300, 400 provide control over the energizing of the LEDs 140 for a selected mode, by controlling the average current level through the LEDs 140. Under the control of the control circuit 110, when the switch 125 is in an on-state and conducting (time interval "T$_{ON}$", illustrated in FIGS. 5A, 5B, and 5C), current will flow into the inductor 145 and LEDs 140 from the DC power supply (battery) 105 or other power source. In FIG. 4, the current sensor 150 senses the current level through the switch 125, and compares (first comparator 115) a corresponding voltage level "V$_C$" (e.g., across the illustrated resistor) to the first predetermined reference voltage level (V1$_{REF}$). When the inductor current has reached the predetermined maximum peak level ($I_P$), based upon the comparison of $V_C$ to $V1_{REF}$ in first comparator 115, the control circuit 110 will turn the switch 125 off (into an off or non-conducting state, for a duration of time interval "$T_{OFF}$", illustrated in FIGS. 5A, 5B, and 5C), and current flow to inductor 145 and LEDs 140 (via diode 170) will begin to decrease to a predetermined minimum current level ($I_{MIN}$). The predetermined minimum current level is substantially close to zero for discontinuous (critical conduction) mode, and greater than zero for a continuous mode (e.g., as illustrated in FIGS. 5A, 5B, and 5C).

For the continuous mode, when switch 125 is off, the second current sensor 345 senses the current level through the inductor 145, and compares (third comparator 380) a corresponding voltage level to the third predetermined reference voltage level ($V3_{REF}$). As mentioned above, second current sensor 345 is typically implemented using a current sense resistor 385 in series with the inductor 145, and a "high" current sensor 390 (which will convert a voltage across the current sense resistor 385 into a common voltage for use by third comparator 380). When the inductor 145 current has reached the predetermined minimum level ($I_{MIN}$), based upon the comparison of the corresponding (common) voltage to $V3_{REF}$ in third comparator 380, the control circuit 110 will turn the switch 125 on (into an on or conducting state), to commence another energizing cycle. For the discontinuous mode of operation, second current sensor 345 is not required. Instead, the current level of the inductor 145 is sensed or monitored indirectly through the voltage divider 185, which effectively senses a voltage across the switch 125. As the inductor 145 current level substantially approaches zero and the magnetic field of the inductor 145 collapses, a corresponding voltage level (across the switch 125 and detected by voltage divider 185) changes abruptly, in a step-wise manner, dropping from $V_{IN}$ to approximately $V_{IN}$ minus $V_{LED}$ (the voltage across LEDs 140). Accordingly, the voltage across resistor 160 of voltage divider 185 also drops, and the corresponding voltage is compared to the second predetermined reference voltage level ($V2_{REF}$) by second comparator 120, which then provides a corresponding signal to control circuit 110, indicating that the inductor 145 current is substantially close to zero. When the inductor current has reached the predetermined minimum level ($I_{MIN}$), for either continuous mode or discontinuous mode, the control circuit 110 will turn the switch 125 on (into an on or conducting state), to commence another energizing cycle. As mentioned above, in the event the regulators 100, 200, 300, 400 will be operated in only a continuous mode or a discontinuous mode and not possibly both, then only one set of corresponding components may be included.

The current through the LEDs 140 during both $T_{ON}$ and $T_{OFF}$ time periods then provides light output of the desired intensity and duration. It should be noted that the first predetermined reference voltage level ($V1_{REF}$), the second predetermined reference voltage level ($V2_{REF}$), and the third predetermined reference voltage level ($V3_{REF}$), may be any suitable voltage levels, may be determined based upon desired current levels and resistance values (such as for resistors which may be utilized to implement current sensors 150, 385, and voltage sensor 185), and further may be selectable by the control circuit 110 from a plurality of reference voltage levels (e.g., corresponding to a plurality of peak current parameters "$I_P$," minimum current parameters "$I_{MIN}$," and average output DC current parameters "$I_O$," discussed below).

As mentioned above, the desired output brightness intensity levels are provided through the control of the average current level (through the inductor 145 and LEDs 140, equivalently) by the representative regulators 100, 200, 300, 400. In accordance with the disclosure, this average output DC current ($I_O$) is calculated using a linear approximation such as (Equation 1), for discontinuous (critical conduction) mode:

$$I_O = \frac{I_P}{2},$$

(or, with substantial rather than exact equality $$I_O \approx \frac{I_P}{2},$$

or more generally with proportionality $$I_O \propto \frac{I_P}{2}\Big),$$

where "$I_P$" is the peak current through the inductor 145, as illustrated in FIGS. 5A, 5B, and 5C. For continuous mode, this average output DC current ($I_O$) is also calculated using a linear approximation such as (Equation 2):

$$I_O = \frac{I_P + I_{MIN}}{2},$$

(or, with substantial rather than exact equality $$I_O \approx \frac{I_P + I_{MIN}}{2},$$

or more generally with proportionality $$I_O \propto \frac{I_P + I_{MIN}}{2}\Big),$$

where "$I_P$" is the peak current through the inductor 145 and "$I_{MIN}$" is the minimum current through the inductor 145, also as illustrated in FIGS. 5A, 5B, and 5C. Stated another way, Equation 1 is a special case of Equation 2 with $I_{MIN}$ substantially equal to zero. By maintaining the peak and minimum current at substantially constant levels, then the average DC current $I_O$ is also substantially constant.

FIGS. 5A, 5B, and 5C are graphical diagrams of current levels for a representative current regulator (or converter) in accordance with the teachings of the present disclosure. As illustrated in FIG. 5A, input voltage levels may vary, illustrated as beginning at $V1_{IN}$, increasing to $V2_{IN}$, and then decreasing to $V3_{IN}$ (which is less than $V1_{IN}$). FIG. 5B illustrates current flow through the inductor 145 and LEDs 140 for discontinuous mode (i.e., $I_{MIN}$ substantially close to zero), while FIG. 5C illustrates current flow through the inductor 145 and LEDs 140 for continuous mode (i.e., $I_{MIN}$ greater than zero). During interval 205, with an input voltage level of $V1_{IN}$, the controller 310 provides the illustrated $T_{ON}$ and $T_{OFF}$ intervals to maintain substantially constant the peak and minimum current levels, as illustrated. Similarly, during interval 210, with the higher input voltage level of $V2_{IN}$, the controller 310 has decreased both the $T_{ON}$ and $T_{OFF}$ intervals as illustrated, also to maintain substantially constant the same peak and minimum current levels provided during interval 205. Lastly, during interval 215, with the lower input voltage level of $V3_{IN}$, the controller 310 has increased both the $T_{ON}$ and $T_{OFF}$ intervals as illustrated, also to maintain substantially constant the same peak and minimum current levels provided during interval 205 and 210. As illustrated, the controller 310 has effectively altered the switching frequency (or, equivalently, the energizing period) of energizing the LEDs 140, maintaining substantially constant the same peak and minimum current levels, and thereby maintaining substantially constant the same DC average current level. Depending on the inductance value of the inductor 145, the switching frequency is likely to vary from 500 kHz to 2 MHz.

Figure 6:
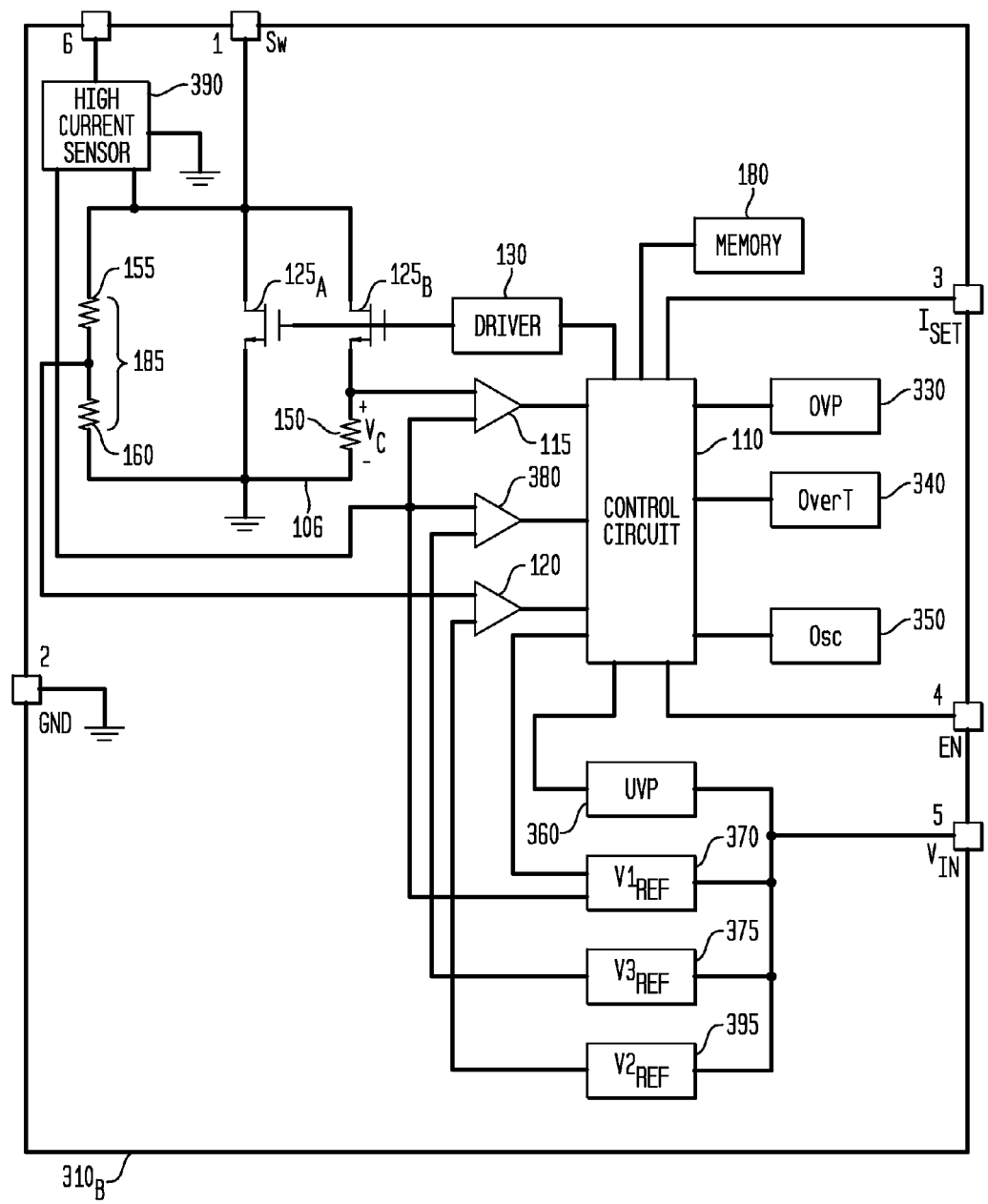
FIG. 6 is a circuit and block diagram of a representative controller utilized for a current regulator (or converter) in accordance with the teachings of the present disclosure.

In accordance with the disclosure, the average output DC current ($I_O$), minimum inductor current ($I_{MIN}$), and peak inductor current ($I_P$) are predetermined values, based on the selected operating mode and desired brightness levels for the selected LEDs 140. For example, corresponding values or parameters, of a plurality of values or parameters for the average output DC current ($I_O$), minimum inductor current ($I_{MIN}$), and peak inductor current ($I_P$), are selected or predetermined for each of the various operating modes, lighting levels, etc. One or more predetermined parameters or levels are then stored in memory 180 (and may be input, for example, via the third terminal "$I_{SET}$" 3 as shown in FIG. 6), corresponding to selected modes and brightness levels. The user may then select the lighting mode, and the corresponding current parameters are then utilized by the current regulating apparatus 100, 200, 300, 400 to provide the selected lighting (i.e., operating) mode of a plurality of available operating or lighting modes, such as brightness levels for flash mode (e.g., in a digital camera or mobile telephone) and brightness levels for a constant (or background) lighting mode.

The mode selection between continuous mode and discontinuous mode (or critical discontinuous mode) typically depends on the selected or predetermined value of the average output DC current ($I_O$). At comparatively smaller values of the average output DC current ($I_O$), the mode is typically (critical) discontinuous, while at comparatively larger values of the average output DC current ($I_O$), the mode is typically continuous. The selection between the two modes is typically performed by the control circuit 110, based on values set or predetermined and input through third terminal "$I_{SET}$" 3. Alternatively, for a more universal controller, the values of the average output DC current ($I_O$), minimum inductor current ($I_{MIN}$), and peak inductor current ($I_P$) may be separately input via third terminal "$I_{SET}$" 3.

Also as illustrated in FIGS. 1 through 4, the controller 310 is utilized to provide the control, measurements, counts, and calculations discussed above, with the illustrated pin or terminal connections 1, 2, 3, 4, 5, and 6 to the balance of the current regulating circuit, with controller 310$_A$ of FIG. 4 and controller 310$_B$ of FIG. 6 being selected representative embodiments or instantiations of controller 310. User inputs are provided to the controller 310, for the user to select the desired operating mode, illustrated as an enable input (on/off) 4, and an operating mode input (third terminal "$I_{SET}$" 3), such as for selection of modes or parameters, in addition to input voltage (5), ground (2), switch (1), and current sense (6) terminals. As mentioned above, however, for the embodiment illustrated in FIG. 3, terminal 2 and rail portion 106 are not coupled to ground, and instead is coupled as illustrated to inductor 145.

FIG. 6 is a circuit and block diagram of a representative controller 310$_B$ utilized for a current regulator (or converter) 100, 200, 300, 400 in accordance with the teachings of the present disclosure, and operates to provide current regulation as previously discussed. In this exemplary embodiment, controller 310$_B$ also includes additional, desirable features for embodiment within various devices, such as within lighting fixtures, cameras, and mobile telephones, for example. As illustrated in FIG. 6, switch 125 is implemented utilizing two MOSFET transistors 125$_A$ and 125$_B$. A first predetermined voltage reference V1$_{REF}$ is generated in block 370, a second predetermined voltage reference V2$_{REF}$ is generated in block 395, and a third predetermined voltage reference V3$_{REF}$ is generated in block 375, and each may be implemented as a voltage divider, for example, and may be selectable by the control circuit 110, such as to set different reference voltage levels to correspond to a selected operating mode. Over-voltage and over-temperature protection are provided in blocks 330 and 340, respectively, while an input clock signal is provided by oscillator 350. Under-voltage protection is provided in block 360, which monitors the voltage ($V_{IN}$) provided by the DC power supply (e.g., battery) 105 and if too low, is adapted to turn off the apparatus 100, 200, 400 to avoid depleting or ruining the battery. The illustrated memory 180 may include stored values for the average output DC current ($I_O$), minimum inductor current ($I_{MIN}$), and peak inductor current ($I_P$), or may include means (not separately illustrated) to supply such values from an external source.

Figure 7:
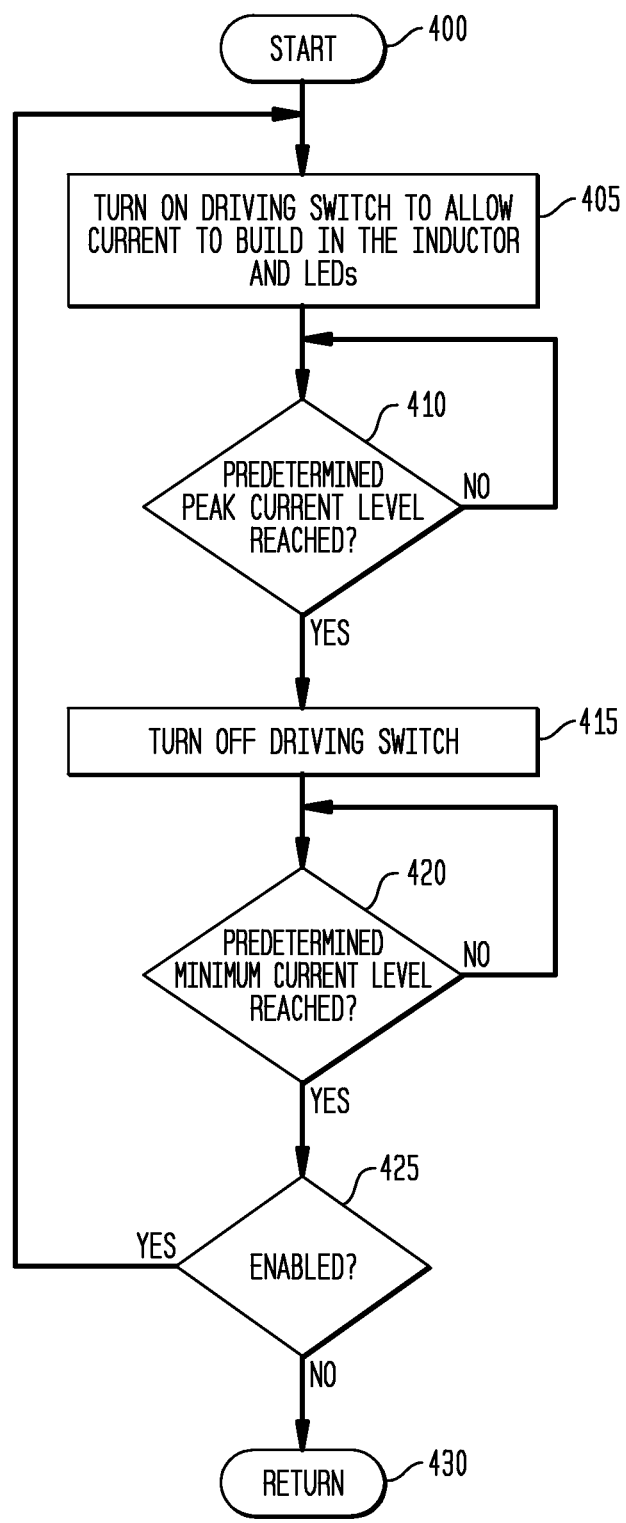
FIG. 7 is a flow chart diagram of a representative method embodiment for current regulation in accordance with the teachings of the present disclosure.

FIG. 7 is a flow chart diagram of a representative method embodiment for current regulation in accordance with the teachings of the present disclosure, and provides a useful summary. Beginning with start step 400, such as when an on or enable signal has been received, the driving switch 125 is turned on, step 405, typically by and under the control of the control circuit 110 of a controller 310, 310$_A$, 310$_B$. The switch 125 is maintained in an on state until the predetermined peak inductor current level ($I_P$) is reached, step 410. As mentioned above, the determination of whether the peak inductor current level ($I_P$) has been reached is based on comparing a corresponding first voltage level ($V_C$) from current sensor (or resistor) 150 to a first predetermined reference voltage level (V1$_{REF}$) using first comparator 115.

When the predetermined peak inductor current level $I_P$ is reached in step 410, the driving switch 125 is turned off, step 415, also typically by and under the control of the control circuit 110 of a controller 310, 310$_A$, 310$_B$. As illustrated in FIGS. 5A, 5B, and 5C, the inductor current level then begins to decrease to a predetermined minimum current level ($I_{MIN}$), and may be measured using a corresponding second voltage level generated across voltage divider 185, such as by detecting a change in voltage as the magnetic field in the inductor 145 collapses, or by measuring a corresponding second voltage level provided by a second current sensor 345. The corresponding second voltage level is then compared (in second comparator 120 or third comparator 380) to a second or third predetermined reference voltage level, such as predetermined reference voltage levels (V2$_{REF}$) or (V3$_{REF}$), as illustrated in FIGS. 4 and 6.

When the inductor current level is substantially close to or equal to the predetermined minimum current level ($I_{MIN}$) in step 420, and when the apparatus continues to be enabled (on) in step 425, the method continues and a new energizing cycle starts, returning to step 405 to turn on the driving switch for another, next cycle of energizing the LEDs 140. When no longer enabled in step 425, the method may end, return step 430.

FIG. 8 is a graphical diagram illustrating input voltage and LED current levels during a simulation of a representative embodiment of a current regulator (or converter) in accordance with the teachings of the present disclosure, and serves to illustrate the extremely fast and accurate responsiveness of the regulator systems 100, 200, 300, and 400. As illustrated in FIG. 8, an input voltage level 505 is initially at 8 V, jumps to 16 V, and subsequently jumps back to 8 V. The illustrated settling time is approximately 1.51 microseconds, and the output current 510 is maintained substantially constant at 750 mA, with a small deviation of about +17 mA during the settling time. The output voltage 515 across LEDs 140 was also maintained substantially constant at 4.34 V.

The representative embodiments of the disclosure provide digital control over the desired average output DC current level ($I_O$), based on the selected operating mode and desired brightness levels for the selected LEDs 140, by modulating the frequency of energizing of the LEDs 140. Stated another equivalent way, for a selected peak inductor current level ($I_P$), a selected minimum inductor current ($I_{MIN}$), and desired average output DC current level ($I_O$), dependent upon the inductance value of the inductor 145 and other operating parameters of the selected LEDs 140, the present disclosure effectively varies the on-time and the off-time of the switch 125 to provide control over the average output DC current level ($I_O$) provided to the LEDs 140, and corresponding light output for the selected operating mode.

In addition, the representative embodiments allow current to be sourced independently of the impedance, i.e., independently of the number of diodes comprising LEDs 140. This current regulation is also provided in an open-loop system, without requiring measurement of the current levels through the LEDs 140, thereby eliminating corresponding power losses, enabling greater efficiencies, and extending battery life (particularly valuable for portable applications, such as for cameras, mobile telephones, notebook computers, and personal digital assistants).

Numerous advantages of the present disclosure for providing power to solid state lighting, such as light emitting diodes, are readily apparent. The representative embodiments allow multiple modes of operation. The representative current regulator embodiments provide digital control, without requiring external compensation. The representative current regulator embodiments also utilize comparatively fewer components, providing reduced cost and size, while simultaneously providing increased efficiency and enabling longer battery life when used in portable devices.

Although the disclosure has been described with respect to specific embodiments thereof, these embodiments are merely illustrative and not restrictive of the disclosure. In the description herein, numerous specific details are provided, such as examples of electronic components, electronic and structural connections, materials, and structural variations, to provide a thorough understanding of embodiments of the present disclosure. An embodiment of the disclosure can be practiced without one or more of the specific details, or with other apparatus, systems, assemblies, components, materials, parts, etc. In other instances, structures, materials, or operations are not specifically shown or described in detail to avoid obscuring aspects of embodiments of the present disclosure. In addition, the various figures are not drawn to scale and should not be regarded as limiting.

Reference throughout this specification to "one embodiment," "an embodiment," or a specific "embodiment" means that a particular feature, structure, or characteristic described in connection with the embodiment is included in at least one embodiment of the present disclosure and not necessarily in all embodiments, and further, are not necessarily referring to the same embodiment. Furthermore, the particular features, structures, or characteristics of any specific embodiment of the present disclosure may be combined in any suitable manner and in any suitable combination with one or more other embodiments, including the use of selected features without corresponding use of other features. In addition, many modifications may be made to adapt a particular application, situation or material to the essential scope and spirit of the claimed subject matter. It is to be understood that other variations and modifications of the embodiments of the present disclosure described and illustrated herein are possible in light of the teachings herein and are to be considered part of the spirit and scope of the claimed subject matter.

It will also be appreciated that one or more of the elements depicted in the figures can also be implemented in a more separate or integrated manner, or even removed or rendered inoperable in certain cases, as may be useful in accordance with a particular application. Integrally formed combinations of components are also within the scope of the disclosure, particularly for embodiments in which a separation or combination of discrete components is unclear or indiscernible. In addition, use of the term "coupled" herein, including in its various forms such as "coupling" or "couplable," means and includes any direct or indirect electrical, structural, or magnetic coupling, connection, or attachment, or adaptation, or capability for such a direct or indirect electrical, structural, or magnetic coupling, connection, or attachment, including integrally formed components and components which are coupled via or through another component.

As used herein for purposes of the present disclosure, the term "LED" and its plural form "LEDs" should be understood to include any electroluminescent diode or other type of carrier injection- or junction-based system which is capable of generating radiation in response to an electrical signal, including without limitation, various semiconductor- or carbon-based structures which emit light in response to a current or voltage, light emitting polymers, organic LEDs, and so on, including within the visible spectrum, or other spectra such as ultraviolet or infrared, of any bandwidth, or of any color or color temperature.

The "controller" or "processor" 310 may be any type of controller or processor, and may be embodied as one or more controllers 310, adapted to perform the functionality discussed herein. As the term controller or processor is used herein, the controller 310 may include use of a single integrated circuit (IC), or may include use of a plurality of integrated circuits or other components connected, arranged or grouped together, such as controllers, microprocessors, digital signal processors (DSPs), parallel processors, multiple core processors, custom ICs, application specific integrated circuits (ASICs), field programmable gate arrays (FPGAs), adaptive computing ICs, associated memory (such as RAM, DRAM, and ROM), and other ICs and components.

As a consequence, as used herein, the term controller (or processor) should be understood to equivalently mean and include a single IC, or arrangement of custom ICs, ASICs, processors, microprocessors, controllers, FPGAs, adaptive computing ICs, or some other grouping of integrated circuits which perform the functions discussed below, with associated memory, such as microprocessor memory or additional RAM, DRAM, SDRAM, SRAM, MRAM, ROM, FLASH, EPROM, or $E^2$PROM. A controller (or processor) (such as controller 310), with its associated memory, may be adapted or configured (via programming, FPGA interconnection, or hard-wiring) to perform the methodology of the disclosure, as discussed below. For example, the methodology may be programmed and stored, in a controller 310 with its associated memory (and/or memory 180) and other equivalent components, as a set of program instructions or other code (or equivalent configuration or other program) for subsequent execution when the processor is operative (i.e., powered on and functioning). Equivalently, while the controllers 310 may be implemented in whole or part as FPGAs, custom ICs, and/or ASICs, the FPGAs, custom ICs, or ASICs may also be designed, configured and/or hard-wired to implement the methodology of the disclosure. For example, the controller 310 may be implemented as an arrangement of controllers, microprocessors, DSPs, and/or ASICs, collectively referred to as a "controller," which are respectively programmed, designed, adapted, or configured to implement the methodology of the disclosure, in conjunction with a memory 180.

The memory 180, which may include a data repository (or database), may be embodied in any number of forms, including within any computer or other machine-readable data storage medium, memory device, or other storage or communication device for storage or communication of information, currently known or which becomes available in the future, including, but not limited to, a memory integrated circuit (IC), or memory portion of an integrated circuit (such as the resident memory within a controller 310 or processor IC), whether volatile or non-volatile, whether removable or non-removable, including without limitation RAM, FLASH, DRAM, SDRAM, SRAM, MRAM, FeRAM, ROM, EPROM, or EPROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD), or other optical memory, or any other type of memory, storage medium, or data storage apparatus or circuit, which is known or which becomes known, depending upon the selected embodiment. In addition, such computer readable media includes any form of communication media which embodies computer readable instructions, data structures, program modules, or other data in a data signal or modulated signal, such as an electromagnetic or optical carrier wave or other transport mechanism, including any information delivery media, which may encode data or other information in a signal, wired or wirelessly, including electromagnetic, optical, acoustic, RF, or infrared signals, and so on. The memory 180 may be adapted to store various look up tables, parameters, coefficients, other information and data, programs or instructions (of the software of the present disclosure), and other types of tables such as database tables.

As indicated above, the controller 310 is programmed, using software and data structures of the disclosure, for example, to perform the methodology of the present disclosure. As a consequence, the system and method of the present disclosure may be embodied as software which provides such programming or other instructions, such as a set of instructions and/or metadata embodied within a computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code, or metadata of the present disclosure may be embodied as any type of code, such as C, C++, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a construct," "program construct," "software construct," or "software," as used equivalently herein, means and refers to any programming language, of any kind, with any syntax or signatures, which provides or can be interpreted to provide the associated functionality or methodology specified (when instantiated or loaded into a processor or computer and executed, including the controller 310, for example).

The software, metadata, or other source code of the present disclosure and any resulting bit file (object code, database, or look up table) may be embodied within any tangible storage medium, such as any of the computer or other machine-readable data storage media, as computer-readable instructions, data structures, program modules or other data, such as discussed above with respect to the memory 180, e.g., a floppy disk, a CDROM, a CD-RW, a DVD, a magnetic hard drive, an optical drive, or any other type of data storage apparatus or medium, as mentioned above.

Furthermore, any signal arrows in the drawings/figures should be considered only representative, and not limiting, unless specifically noted otherwise. Combinations of components or steps will also be considered within the scope of the present disclosure, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a," "an," and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present disclosure, including what is described in the summary or in the abstract, is not intended to be exhaustive or to limit the disclosure to the precise forms disclosed herein. From the foregoing, it will be observed that numerous variations, modifications, and substitutions are intended and may be effected without departing from the spirit and scope of the claimed subject matter. It is to be understood that no limitation with respect to the specific methods and apparatus illustrated herein is intended or should be inferred. It is, of course, intended to cover by the appended claims all such modifications as fall within the scope of the claims.

It is claimed:

1. A current regulator configured to control current to solid state lighting, the current regulator couplable to a power source, the current regulator comprising:
   a memory configured to store a plurality of current parameters;
   a control circuit coupled to the memory, wherein the control circuit is configured to modulate an energizing cycle time period, and wherein the control circuit is further configured to provide a substantially constant DC average current to the solid state lighting in response to a selected current parameter from the plurality of current parameters;
   an inductor coupled to the solid state lighting;
   a switch coupled to the control circuit and to either the inductor or the solid state lighting;
   a current sensor coupled to the switch; and
   a first comparator coupled to the current sensor and the control circuit, wherein the control circuit is further configured to turn the switch on to commence an energizing cycle and to turn the switch off when the first comparator indicates that an inductor current has increased to a predetermined peak level.

2. The current regulator of claim 1, further comprising:
a voltage sensor; and
a second comparator coupled to the voltage sensor and the control circuit, wherein the control circuit is further configured to turn the switch on to commence an energizing cycle when the second comparator indicates that an inductor current has decreased to a predetermined minimum level.

3. The current regulator of claim 1, further comprising:
a second current sensor; and
a second comparator coupled to the second current sensor and the control circuit, wherein the control circuit is further configured to turn the switch on to commence an energizing cycle when the second comparator indicates that an inductor current has decreased to a predetermined minimum level.

4. The current regulator of claim 1, wherein the power source is a battery, a DC power source, or an AC power source coupled to a rectifier.

5. The current regulator of claim 1, wherein the plurality of current parameters comprise a predetermined minimum current level ($I_{MIN}$) and a predetermined peak current level ($I_P$).

6. The current regulator of claim 5, wherein the predetermined minimum current level ($I_{MIN}$) is substantially close to zero.

7. The current regulator of claim 5, wherein the control circuit is further configured to provide the substantially constant DC average current by maintaining substantially constant a predetermined peak current level ($I_P$) and a predetermined minimum current level ($I_{MIN}$).

8. The current regulator of claim 5, wherein the control circuit is further configured to modulate the energizing cycle time period by providing an increasing current level to an inductor until the predetermined peak current level ($I_P$) is substantially reached and subsequently by providing a decreasing current level to the inductor until the predetermined minimum current level ($I_{MIN}$) is substantially reached.

9. The current regulator of claim 8, wherein the DC average current level ($I_O$) is substantially equal to one-half of a sum of a predetermined peak current level ($I_P$) and a predetermined minimum current level $$I_{MIN}\left(I_O \approx \frac{I_P + I_{MIN}}{2}\right).$$

10. The current regulator of claim 8, wherein the DC average current level ($I_O$) is substantially proportional to one-half of a sum of a predetermined peak current level ($I_P$) and a predetermined minimum current level $$I_M\left(I_O \propto \frac{I_P + I_{MIN}}{2}\right).$$

11. An apparatus for controlling current to solid state lighting, the apparatus couplable to a power source, the apparatus comprising:
a memory configured to store a predetermined minimum current level ($I_{MIN}$) parameter and a predetermined peak current level ($I_P$) parameter;
an inductor coupled to the solid state lighting;
a controller coupled to the memory, wherein the controller is configured to provide a substantially constant DC average current to the solid state lighting, wherein the controller is further configured to modulate a current provided to the solid state lighting in response to the predetermined minimum current level ($I_{MIN}$) parameter and the predetermined peak current level ($I_P$) parameter, and wherein the controller includes:
a control circuit;
a switch coupled to the control circuit and to either the inductor or the solid state lighting; and
a current sensor coupled to the switch; and
a first comparator coupled to the current sensor and the control circuit, wherein the control circuit is configured to turn the switch on to commence an energizing cycle and to turn the switch off when the first comparator indicates that an inductor current has reached the predetermined peak current level.

12. The apparatus of claim 11, wherein the predetermined minimum current level ($I_{MIN}$) is substantially close to zero.

13. The apparatus of claim 11, wherein the controller is further configured to provide the substantially constant DC average current by maintaining substantially constant a predetermined peak current level ($I_P$) and a predetermined minimum current level ($I_{MIN}$).

14. The apparatus of claim 11, wherein the controller is further configured to provide an increasing current level to an inductor until a predetermined peak current level ($I_P$) is substantially reached and to provide a decreasing current level to the inductor until a predetermined minimum current level ($I_{MIN}$) is substantially reached.

15. The apparatus of claim 11, wherein the DC average current level ($I_O$) is substantially equal to one-half of a sum of a predetermined peak current level ($I_P$) and a predetermined minimum current level $$I_{MIN}\left(I_O \approx \frac{I_P + I_{MIN}}{2}\right).$$

16. The apparatus of claim 11, wherein the DC average current level ($I_O$) is substantially proportional to one-half of a sum of the predetermined peak current level ($I_P$) and the predetermined minimum current level $$I_M\left(I_O \propto \frac{I_P + I_{MIN}}{2}\right).$$

17. The apparatus of claim 11, wherein the controller further comprises:
a voltage sensor; and
a second comparator coupled to the voltage sensor and the control circuit, wherein the control circuit is further configured to turn the switch on to commence an energizing cycle when the second comparator indicates that an inductor current has reached the predetermined minimum current level.

18. The apparatus of claim 11, wherein the controller further comprises:
a second current sensor; and
a second comparator coupled to the second current sensor and the control circuit, wherein the control circuit is further configured to turn the switch on to commence an energizing cycle when the second comparator indicates that an inductor current has reached the predetermined minimum current level.

19. A current regulator configured to provide substantially constant DC average current to solid state lighting, the current regulator couplable to a power source, the current regulator comprising:
an inductor coupled to the power source and the solid state lighting;
a switch coupled to either the inductor or the solid state lighting;
a first current sensor coupled to the switch;
a first comparator coupled to the first current sensor;
a voltage sensor coupled to the switch;
a second comparator coupled to the voltage sensor;
a memory configured to store a plurality of current parameters; and
a control circuit coupled to the memory and to the first and second comparators, wherein the control circuit is configured to turn the switch on to commence an energizing cycle when the second comparator indicates that an inductor current has reached a predetermined minimum level and to turn the switch off when the first comparator indicates that the inductor current has reached a predetermined peak level.

20. An apparatus couplable to solid state lighting, the apparatus comprising:
means for storing a plurality of current parameters;
means for modulating an energizing cycle time period;
means for providing a substantially constant DC average current to the solid state lighting in response to a selected current parameter from the plurality of current parameters;
means for indicating that an inductor current has increased to a predetermined peak level; and
means for activating a switch to commence an energizing cycle and deactivating the switch when the inductor current has increased to a predetermined peak level.

21. The apparatus of claim 20, further comprising:
means to indicate that an inductor current has decreased to a predetermined minimum level; and
means for turning the switch on to commence an energizing cycle when the inductor current has decreased to the predetermined minimum level.

22. An apparatus configured to control current to solid state lighting, the system couplable to a power source, the system comprising:
means for storing a predetermined minimum current level ($I_{MIN}$) parameter and a predetermined peak current level ($I_P$) parameter;
means for providing a substantially constant DC average current to the solid state lighting;
means for modulating a current provided to the solid state lighting in response to the predetermined minimum current level ($I_{MIN}$) parameter and the predetermined peak current level ($I_P$) parameter;
means for indicating that an inductor current level has reached a predetermined peak level; and
means for turning a switch on to commence an energizing cycle and turning the switch off when the inductor current has reached the predetermined peak level.

23. The apparatus of claim 22, further comprising:
means to indicate that an inductor current has reached a predetermined minimum level; and
means for turning the switch on to commence an energizing cycle when the inductor current has reached the predetermined minimum level.

* * * * *

UNITED STATES PATENT AND TRADEMARK OFFICE
CERTIFICATE OF CORRECTION

PATENT NO. : 8,427,066 B2
APPLICATION NO. : 13/280555
DATED : April 23, 2013
INVENTOR(S) : Shteynberg et al.

It is certified that error appears in the above-identified patent and that said Letters Patent is hereby corrected as shown below:

On the Title Page, under "Related U.S. Application Data", in Column 1, Line 1, delete item "(60)" and insert item -- (63) --, therefor.

On the Title Page, item (60), under "Related U.S. Application Data", in Column 1, Lines 2-3, delete "8,067,896, and a division of application No. 11/804,549." and insert -- 8,067,896. --, therefor.

On the Title Page, item (57), under "Abstract", in Column 2, Line 16, delete " $I_M \left( I_O \propto \frac{I_P + I_{MIN}}{2} \right).$ " and insert -- $I_{MIN} \left( I_O \propto \frac{I_P + I_{MIN}}{2} \right).$ --, therefor.

In the Specification:

In Column 1, Line 55, delete "present invention" and insert -- present disclosure --, therefor.

In Column 2, Line 29, delete "(I₀)" and insert -- ($I_O$) --, therefor.

In Column 2, Lines 43-44, delete " $I_M \left( I_O \propto \frac{I_P + I_{MIN}}{2} \right).$ " and insert -- $I_{MIN} \left( I_O \propto \frac{I_P + I_{MIN}}{2} \right).$ --, therefor.

In Column 6, Line 34, delete "(I₀)" and insert -- ($I_O$) --, therefor.

In Column 13, Line 25, delete "or EPROM," and insert -- or E²PROM, --, therefor.

In the Claims:

In Column 14, Lines 52-53, in Claim 1, delete "parameters:" and insert -- parameters; --, therefor.

Signed and Sealed this
Eighth Day of October, 2013

Teresa Stanek Rea
*Deputy Director of the United States Patent and Trademark Office*

CERTIFICATE OF CORRECTION (continued)

U.S. Pat. No. 8,427,066 B2

In Column 15, Lines 58-59, in Claim 10, delete "$I_M\left(I_O \propto \dfrac{I_P + I_{MIN}}{2}\right).$" and insert --$I_{MIN}\left(I_O \propto \dfrac{I_P + I_{MIN}}{2}\right).$--, therefor.

In Column 16, Lines 49-50, in Claim 16, delete "$I_M\left(I_O \propto \dfrac{I_P + I_{MIN}}{2}\right).$" and insert --$I_{MIN}\left(I_O \propto \dfrac{I_P + I_{MIN}}{2}\right).$--, therefor.